(12) United States Patent
Cadima (10) Patent No.: US 10,429,075 B2
(45) Date of Patent: Oct. 1, 2019

(54) COOKTOP APPLIANCE AND METHODS OF OPERATION

(71) Applicant: Haier US Appliance Solutions, Inc., Wilmington, DE (US)

(72) Inventor: Paul Bryan Cadima, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 190 days.

(21) Appl. No.: 15/606,001

(22) Filed: May 26, 2017

(65) Prior Publication Data

US 2018/0340691 A1 Nov. 29, 2018

(51) Int. Cl.
| | |
|---|---|
| *F24C 3/12* | (2006.01) |
| *F24C 3/08* | (2006.01) |
| *A47J 37/06* | (2006.01) |
| *F24C 15/10* | (2006.01) |

(52) U.S. Cl.
CPC ............. *F24C 3/08* (2013.01); *A47J 37/0682* (2013.01); *F24C 3/126* (2013.01); *F24C 15/107* (2013.01)

(58) Field of Classification Search
CPC ...................................................... F24C 3/08
USPC ......................................................... 126/1 R
See application file for complete search history.

(56) References Cited

U.S. PATENT DOCUMENTS

| | | | |
|---|---|---|---|
| 6,017,211 A | 1/2000 | Gort et al. | |
| 8,033,279 B2 | 10/2011 | Shaffer | |
| 8,171,844 B2 | 5/2012 | Northcut et al. | |
| 2013/0014744 A1* | 1/2013 | Hensley | F24C 3/08 126/39 E |
| 2016/0025348 A1 | 1/2016 | Cadima | |
| 2017/0023254 A1 | 1/2017 | Cadima | |

* cited by examiner

*Primary Examiner* — Avinash A Savani
(74) *Attorney, Agent, or Firm* — Dority & Manning, P.A.

(57) ABSTRACT

A cooktop appliance and methods of operation are provided herein. The cooktop appliance may include a panel comprising a top surface and a bottom surface, a first burner assembly, a second burner assembly, a first control valve, a second control valve, and a controller. The first burner assembly may include a first burner extending at least partially above the top surface of the panel. The second burner assembly may be spaced apart from the first burner assembly on the panel. The second burner assembly may include a second burner extending at least partially above the top surface of the panel. The first control valve may be in fluid communication with the first burner assembly to selectively direct a flow of gas thereto. The second control valve may be in fluid communication with the second burner assembly to selectively direct a flow of gas thereto.

20 Claims, 7 Drawing Sheets

COOKTOP APPLIANCE AND METHODS OF OPERATION

FIELD OF THE INVENTION

The present subjection matter relates generally to cooktop appliances, such as cooktop appliances with multiple gas burners for heating a griddle assembly.

BACKGROUND OF THE INVENTION

Cooking appliances, e.g., cooktops or ranges (also known as hobs or stoves), generally include one or more heated portions for heating or cooking food items within or on a cooking utensil placed on the heated portion. For instance, burners may be included with each heated portion. The heated portions utilize one or more heating sources to output heat, which is transferred to the cooking utensil and thereby to any food item or items that are disposed on or within the cooking utensil. For instance, a griddle may be provided to extend across one or more heated portion. When disposed above the heated portion, the griddle generally provides a substantially flat cooking surface.

Although a griddle may provide a flat cooking surface, difficulties may arise in dispersing or spreading heat across the flat cooking surface. Generally, heat from the burners of the appliance is directly transferred to the griddle according to the footprint of the burner. In turn, heat may be uneven across various portions of the flat cooktop surface. This may result in one portion of the flat cooking surface being heated to a significantly higher temperature than the rest of the flat cooking surface (i.e., creating "hot spots"). If the griddle extends over multiple burners, such hot spots may be increasingly problematic and cause food items thereon to be cooked unevenly. It can be difficult to balance the heat output of multiple burners. Moreover, since the relative heat output of the multiple burners may vary, a user may accidentally overheat the griddle and/or food thereon.

Some existing systems have attempted to address these issues by including a single elongated burner over which a griddle may be arranged. For example, certain gas cooktop appliances with integrated griddles include an elongated burner for more evenly heating the integrated griddle. However, elongated burners can provide limited utility outside of heating griddles. Also, consumers generally only use griddles occasionally. Moreover, a size of integrated griddles may be limited due to the need to center the integrated griddle over the gas burners. Integrated griddles can also block a significant portion of airflow to the gas burner as well as exhaust from the gas burner, which leads to poor combustion and excessive heating of cooktop components.

Accordingly, a gas cooktop appliance with features for evenly heating a removable griddle would be useful. In particular, a gas cooktop appliance with features for evenly heating a large griddle across multiple burners would be useful.

BRIEF DESCRIPTION OF THE INVENTION

Aspects and advantages of the invention will be set forth in part in the following description, or may be obvious from the description, or may be learned through practice of the invention.

In one aspect of the present disclosure, a cooktop appliance is provided. The cooktop appliance may include a panel comprising a top surface and a bottom surface, a first burner assembly, a second burner assembly, a first control valve, a second control valve, and a controller. The first burner assembly may include a first burner extending at least partially above the top surface of the panel. The second burner assembly may be spaced apart from the first burner assembly on the panel. The second burner assembly may include a second burner extending at least partially above the top surface of the panel. The first control valve may be in fluid communication with the first burner assembly to selectively direct a flow of gas thereto. The second control valve may be in fluid communication with the second burner assembly to selectively direct a flow of gas thereto. The controller may be operably coupled to the first control valve and the second control valve. The controller may include a single burner mode and a multi-burner mode. The single burner mode may include independently positioning the first control valve and the second control valve. The multi-burner mode may include cooperatively positioning the first control valve and the second control valve.

In another aspect of the present disclosure, a method of operating cooktop appliance is provided. The method may include receiving a single-burner mode command from a user interface. The method may further include independently positioning one of a first control valve and a second control valve of the cooktop appliance based on the received single-burner mode command. The method may still further include receiving a multi-burner mode command from the user interface, and cooperatively positioning the first control valve and the second control valve based on the received multi-burner mode command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, a cooktop appliance having a removable griddle is provided. Generally, and as will be described in detail below, the cooktop appliance may be configured to simultaneously control multiple gas burners when a griddle is placed across those same gas burners.

FIGS. 1 through 5 illustrate an example embodiment of a cooktop appliance 100 as may be employed with the present disclosure. The example cooktop appliance 100 includes a panel 102 (e.g., a top panel) that extends in a lateral direction L and a transverse direction T. By way of example, the panel 102 may be constructed of enameled steel, stainless steel, glass, ceramics, and combinations thereof.

For the cooktop appliance 100, a utensil holding food and/or cooking liquids (e.g., oil, water, etc.) may be placed onto one or more gas burner assemblies 200 at a location of any gas burner assembly 200. The gas burner assemblies 200 can be configured in various sizes so as to provide e.g., for the receipt of cooking utensils (i.e., pots, pans, etc.) of various sizes and configurations and to provide different heat inputs for such cooking utensils. Each gas burner assembly 200 includes a burner 240 supported on a top surface 104 of panel 102, as discussed in greater detail below. During use, the gas burner assemblies 200 may generally provide thermal energy to cooking utensils above panel 102.

A user interface panel 110 is located within convenient reach of a user of the cooktop appliance 100. For this example embodiment, the user interface panel 110 includes user inputs, such as knobs 112, that are each associated with one of the gas burner assemblies 200 (e.g., in certain operating modes). The knobs 112 may allow the user to activate each burner assembly 200 and determine an amount of heat input provided by each gas burner assembly 200 to a cooking utensil located thereon. The user interface panel 110 may also be provided with one or more graphical display devices that deliver certain information to the user—e.g., whether a particular burner assembly is activated and/or the level at which the burner assembly is set.

Operation of the cooktop appliance 100 can be regulated by a controller 130 that is operably coupled to (i.e., in operative communication with) the user interface panel 110 and/or gas burner assemblies 200. For example, in response to user manipulation of the knobs 112 of user interface panel 110, the controller 130 operates one or more of the burners 240 of gas burner assemblies 200. By way of example, the controller 130 may include a memory and one or more processing devices such as microprocessors, CPUs or the like, such as general or special purpose microprocessors operable to execute programming instructions or micro-control code associated with operation of appliance 100. The memory may represent random access memory such as DRAM, or read only memory such as ROM or FLASH. In one embodiment, the processor executes non-transitory programming instructions stored in memory. For certain embodiments, the instructions include a software package configured to operate appliance 100 and execute an operation routine including the example method 800, described below with reference to FIG. 8. The memory may be a separate component from the processor or may be included onboard within the processor.

The controller 130 may be disposed in a variety of locations throughout appliance 100. In example embodiments, the controller 130 may be located under or next to the user interface panel 110. In such an embodiment, input/output ("I/O") signals are routed between the controller 130 and various operational components of appliance 100, such as the gas burner assemblies 200, controls 112, a graphical display, one or more sensors, and/or one or more alarms. In one embodiment, the user interface panel 110 may represent a general purpose I/O ("GPIO") device or functional block.

Although shown with multiple knobs 112, it should be understood that knobs 112 and the configuration of the cooktop appliance 100 shown in FIGS. 1 through 5 are provided by way of example only. More specifically, the user interface panel 110 may include various input components, such as one or more of a variety of touch-type controls, electrical, mechanical or electro-mechanical input devices including rotary dials, push buttons, and touch pads. The user interface panel 110 may include other display components, such as a digital or analog display device designed to provide operational feedback to a user. The user interface 110 may be in communication with the controller 130 via one or more signal lines or shared communication busses. The user interface 110 may be located on a different surface of the appliance, for instance, an angled front edge or a vertical backsplash.

The cooktop appliance 100 shown in FIGS. 1 through 5 illustrates an example embodiment of the present disclosure. Thus, although described in the context of cooktop appliance 100, the present disclosure may be used in cooktop appliances having other configurations, e.g., a cooktop appliance with fewer burner assemblies or additional burner assemblies. Similarly, the present disclosure may be used in cooktop appliances that include an oven, i.e., range appliances.

Figure 5:
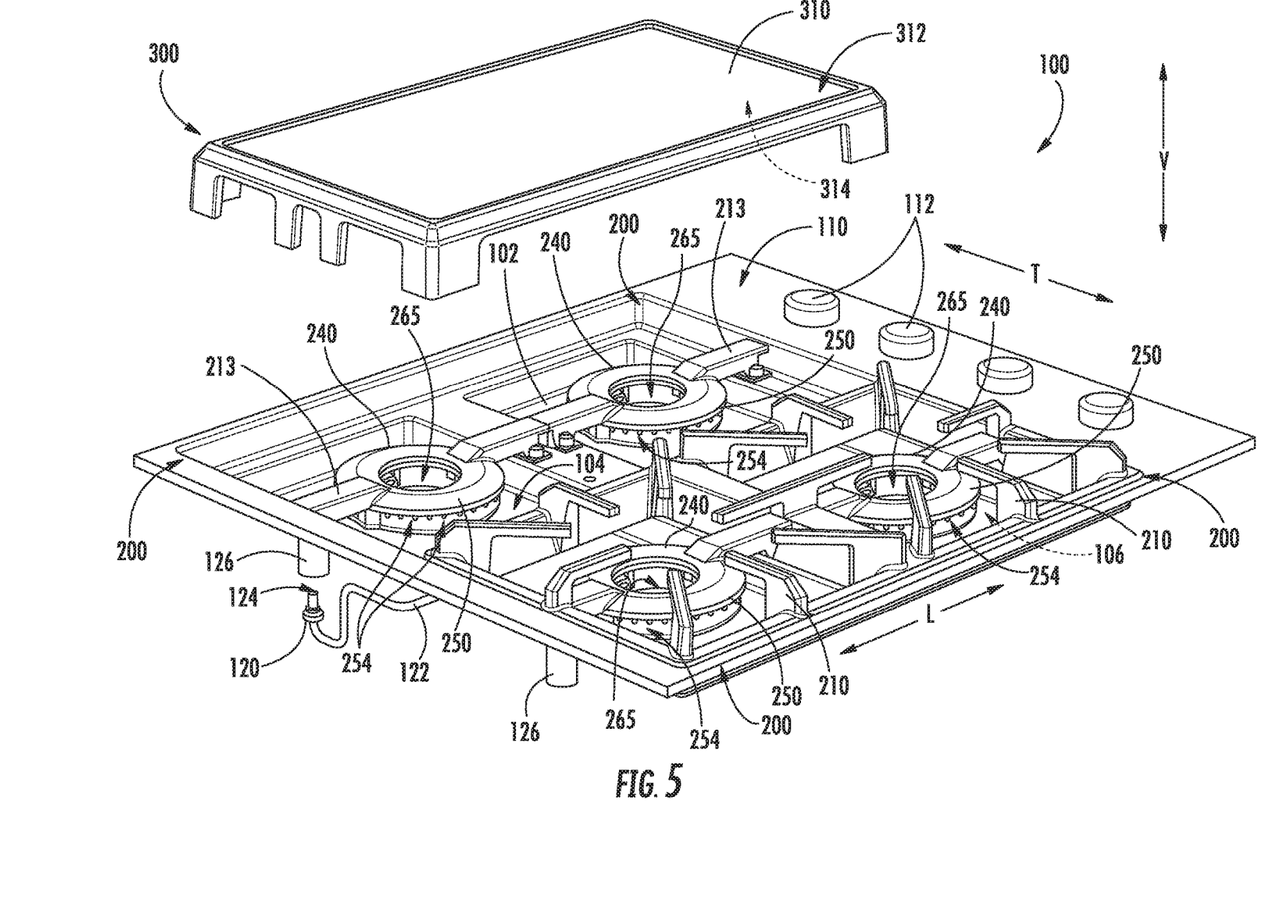
FIG. 5 provides a side perspective view of the example cooktop appliance of FIG. 4.

As illustrated in FIG. 5, the cooktop appliance 100 includes control valves 120, fuel lines 122, and fuel orifices 124. Control valves 120 may be generally provided as any suitable valve (e.g., an electronic gas control valve) for selectively limiting the flow of gas therethrough. Control valves 120 may be mounted beneath panel 102 (e.g., to a bottom surface 106 of panel 102). Fuel lines 122 and fuel orifices 124 may also be disposed below panel 102, e.g., at or adjacent a bottom surface 106 of panel 102). The control valves 120 are each coupled to a respective one of knobs 112. Thus, a user may adjust one or more of the control valves 120 with the knobs 112. The control valves 120 are configured for regulating fuel flow to gas burner assemblies 200. For example, each control valve 120 blocks fuel flow to gas burner assemblies 200 when control valves 120 are closed. Conversely, each control valve 120 permits fuel flow to a gas burner assembly 200 when control valves 120 are open. A user may selectively adjust control valves 120 between the open and closed configurations (e.g., with the knobs 112) in order to regulate fuel flow to gas burner assemblies 200.

Generally, it is understood that the fuel lines 122 extend between control valves 120 and fuel orifices 124. Thus, the control valves 120 and fuel orifices 124 may be coupled to the fuel lines 122. When the control valves 120 are open, fuel, such as propane or natural gas, may flow through the fuel lines 122 to the fuel orifices 124. From the fuel orifices 124, fuel may flow into gas burner assemblies 200, where the fuel may be subsequently combusted. For instance, a static igniter (not pictured) may be disposed on the panel 102 (e.g., within a burner ring 250) to combust or ignite fuel from a corresponding adjacent burner 240.

Between the fuel orifices 124 and the gas burner assemblies 200, fuel from the fuel orifices 124 may entrain and mix with air. The cooktop appliance 100 includes features for assisting mixing of air and fuel as fuel enters the gas burner assemblies 200. In particular, the cooktop appliance 100 includes mixing tubes 126 that receive fuel and air, facilitating fluid mixing of the fuel and air. For example, the mixing tubes 126 may be Venturi mixers that define tapered channels such that a pressure of the fuel and air decreases while a velocity of the fuel and air increases. Other suitable means for mixing fuel and air are also contemplated and within the scope of the present disclosure. Downstream of the mixing tubes 126, the pressure of the fuel and air may increase while the velocity of the fuel and air decreases to further assist fluid mixing between the fuel and air entering the gas burner assemblies 200.

Generally, each gas burner assembly 200 includes a burner 240. In some embodiments, the burner 240 includes a generally circular shape from which a flame may be emitted. In the example embodiments, of FIGS. 1 through 5, each burner 240 includes a burner ring 250 disposed on top panel 102. As shown, the example burner ring 250 extends circumferentially about the central void 265. Moreover a plurality of flame ports 254 is defined circumferentially (e.g., such that multiple flame ports 254 are defined, each being at a discrete radial point about the central void 265) in fluid communication with an internal passage of the burner ring 250. An elongated gas duct or conduit 213 may define a passage that extends vertically through panel 102 from the mixing chamber 126 before extending horizontally (i.e., perpendicular to the vertical direction V) to the corresponding burner ring 250. Thus, fluid, such as air and/or gas, may flow through the elongated gas conduit 213 and out of flame ports 254.

It is noted that, although the example embodiments of FIGS. 1 through 5 show burners 240 having a single burner ring 250, the present disclosure is not so limited. For example, according to alternative example embodiment, the burner 240 may be a multi-ring burner. For example, such a multi-ring burner may have an inner burner ring and an outer burner ring concentrically disposed such that outer burner ring extends around the inner burner ring. An inner fuel chamber may be separated from an outer fuel chamber by a wall within burner, and burner may be configured to supply fuel to a plurality of flame ports on the inner burner and outer burner, respectively. Moreover, other suitable burner configurations are also possible.

Figure 1:
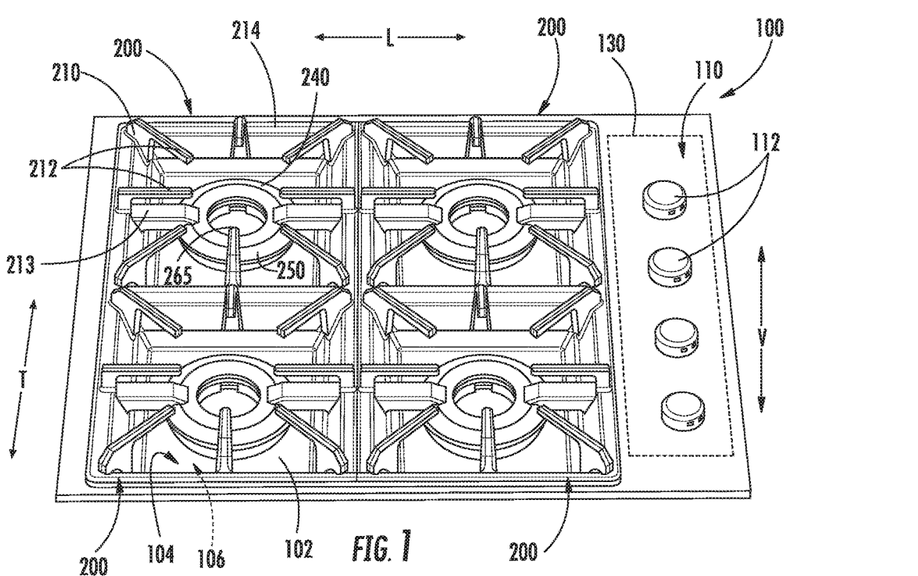
FIG. 1 provides a perspective view of a cooktop appliance according to example embodiments of the present disclosure, wherein a pair of grates has been provided above a top panel in a mounted position.
Figure 2:
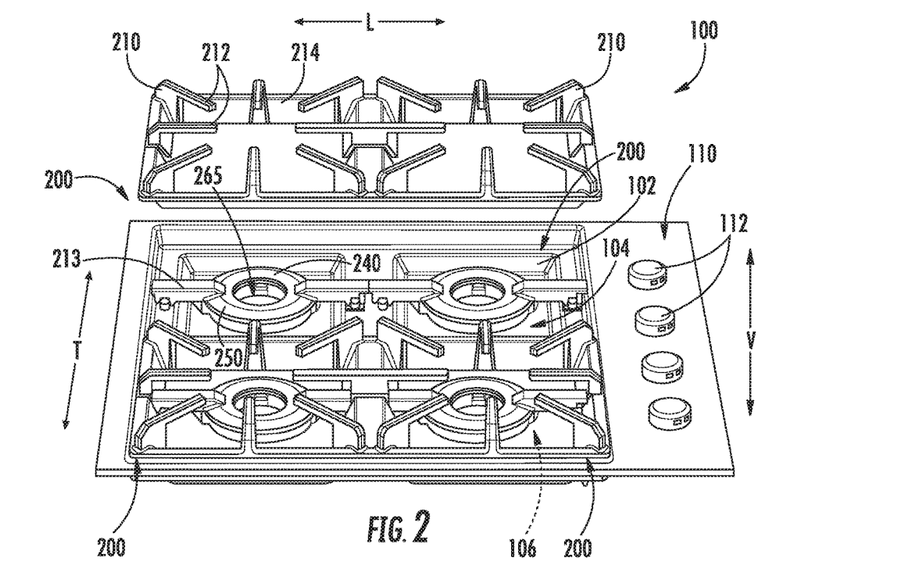
FIG. 2 provides a perspective view of the example cooktop appliance of FIG. 1, wherein a pair of grates has been removably spaced above a top panel in an unmounted position.

In some embodiments, each gas burner assembly 200 includes a grate (e.g., selectively removable grate 210) extending at least partially above a corresponding burner 240 in a mounted position. Generally, the grate 210 is configured for supporting a cooking utensil, such as a pot, pan, etc. in the mounted position. For example, the grate 210 of the exemplary embodiment includes a plurality of elongated members 212, e.g., formed of cast metal, such as cast iron. The cooking utensil may be placed on the elongated members 212 of the grate 210 such that the cooking utensil rests on an upper surface of elongated members 212. The elongated members 212 of the grate 210 may include an outer frame 214 that extends around or defines a perimeter of the grate 210 and/or gas burner assembly 200. Thus, the outer frame 214 may be disposed at an outer portion of the grate 210. When mounted, the grate 210 may selectively rest on panel 102 at the outer frame 214. Thus, in the mounted position, a bottom surface of outer frame 214 may rest on the top surface 104 of panel 102. As shown, the outer frame 214 of grate 210 may be square or rectangular in certain exemplary embodiments. Moreover, as illustrated in FIG. 2, one or more grate 210 may be selectively removable (e.g., to an unmounted position), such that the grate 210 can be readily lifted from the panel 102 and placed away from the corresponding burner 240.

As generally indicated across FIGS. 1 through 5, at least two of the gas burner assemblies 200, may be configured to receive a griddle assembly 300 (e.g., in a mounted position). For instance, the griddle assembly 300 may be selectively disposed on top panel 102 to receive heat from two discrete gas burner assemblies. In the example embodiments of FIGS. 1 through 5, griddle assembly 300 selectively replaces or is used in place of one or more grates 210. However, it is understood that alternative embodiments of griddle assembly 300 may be selectively disposed on top one or more grates 210 at two corresponding burner assemblies 200. Moreover, it is understood that further additional or alternative embodiments may be placed over more than two burner assemblies (i.e., to receive heat output from three or more burner assemblies).

Figure 3:
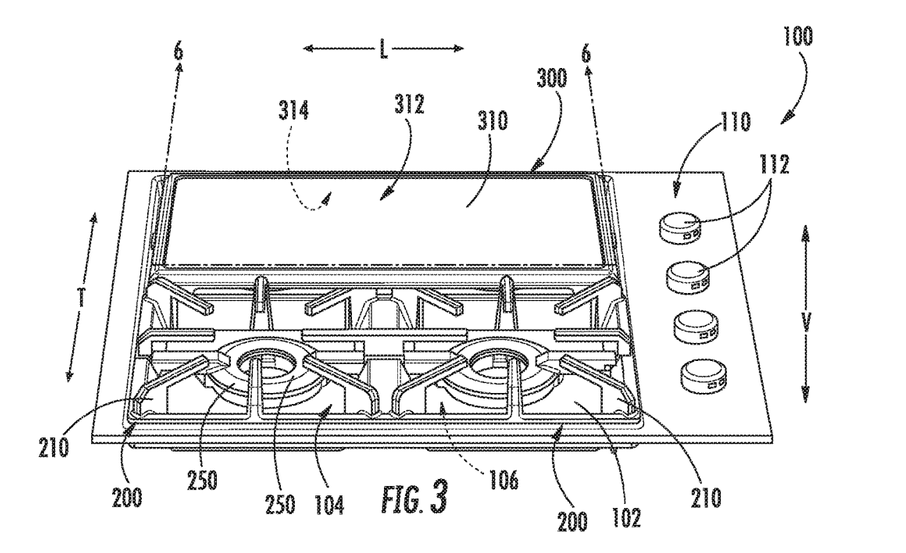
FIG. 3 provides a perspective view of the example cooktop appliance of FIG. 1, wherein a griddle has been provided on a top panel in a mounted position.
Figure 4:
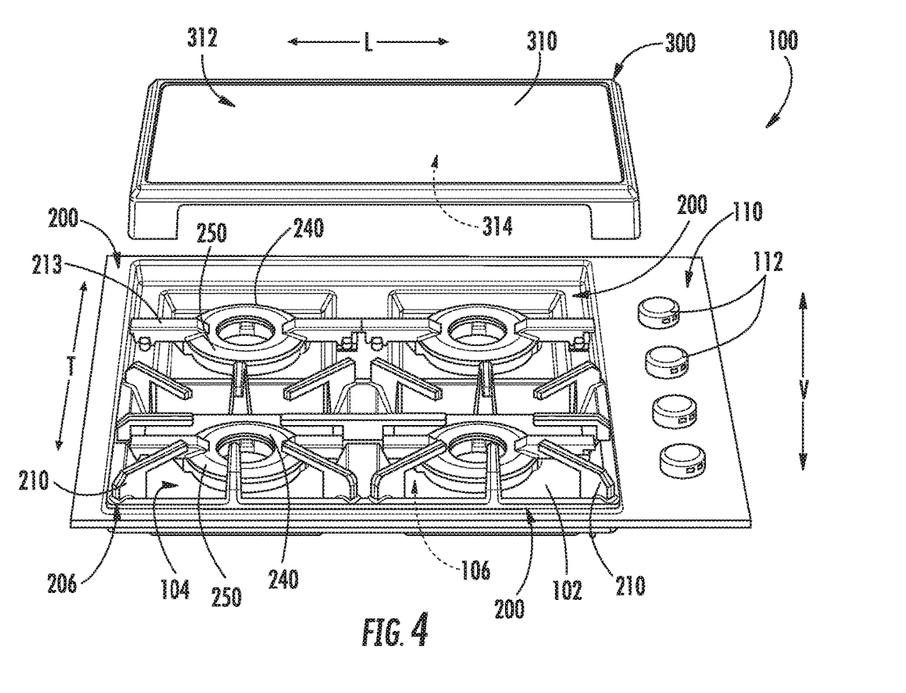
FIG. 4 provides a perspective view of the example cooktop appliance of FIG. 1, wherein a griddle has been removably spaced above a top panel in an unmounted position.

As shown in FIGS. 3 through 5, the griddle assembly 300 includes a griddle plate 310 that may be disposed over top panel 102 (e.g., along the vertical direction V) in a mounted position. Griddle plate 310 defines a top cooking surface 312 and a bottom heating surface 314 below and beneath top cooking surface 312. In example embodiments, griddle plate 310 is a generally planar member. In turn, top cooking surface 312 may be a substantially flat surface. Moreover, one or both of top cooking surface 312 and bottom heating surface 314 may extend perpendicular to the vertical direction V. Griddle plate 310 may have any suitable shape. For example, griddle plate 310 may be substantially rectangular or square, e.g., in a plane that is perpendicular to the vertical direction V.

Figure 6:
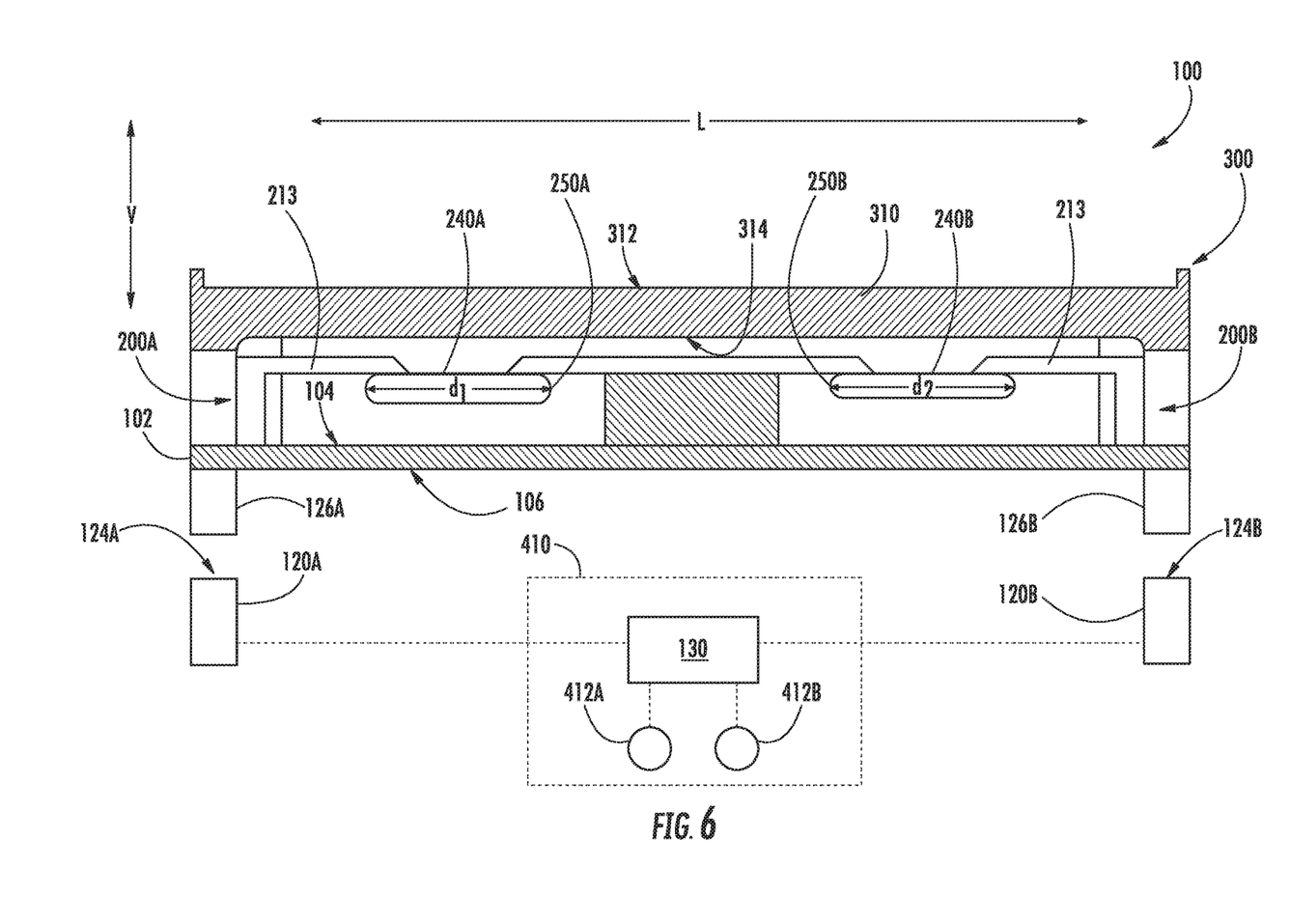
FIG. 6 provides a cross-sectional schematic view of an example cooktop appliance, such as the example cooktop appliance of FIG. 3 viewed along the line 6-6.
Figure 7:
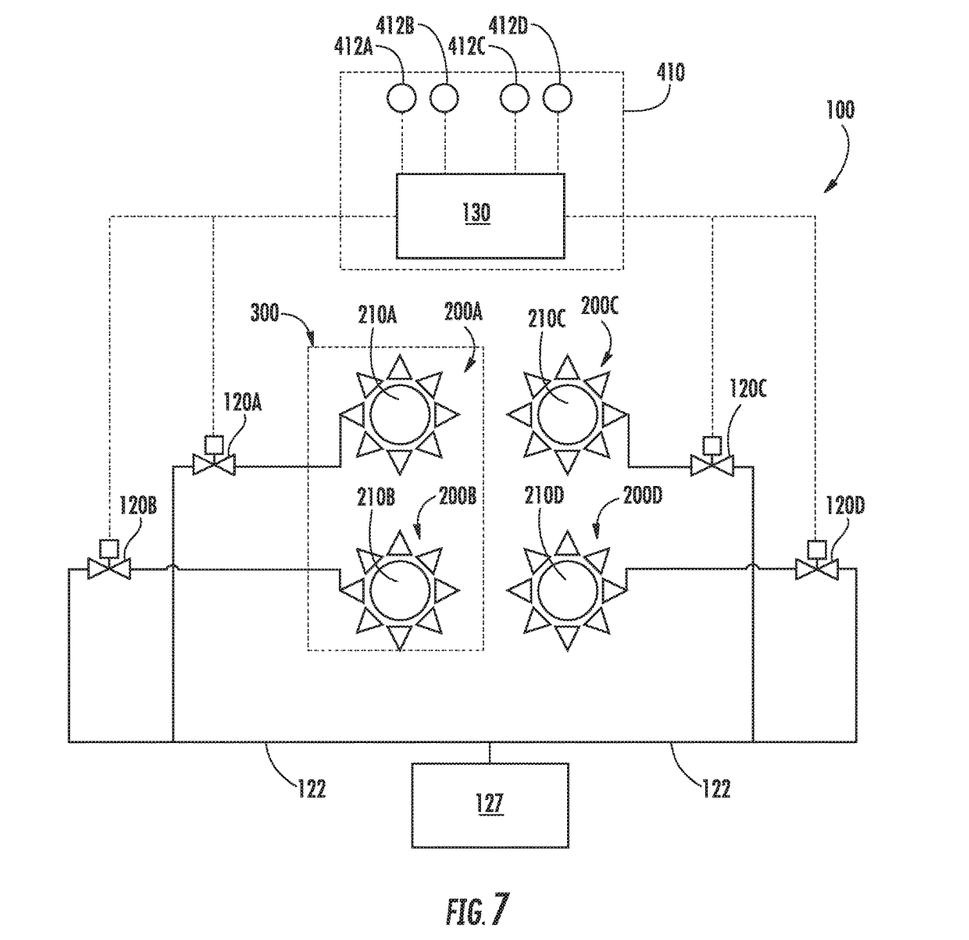
FIG. 7 provides a schematic view of a cooktop appliance according to example embodiments of the present disclosure.

Turning to FIGS. 6 and 7, schematic views for an example cooktop appliance 100 are provided. Specifically, FIG. 6 provides a cross-sectional schematic view of the cooktop appliance along the line 6-6 of FIG. 3. FIG. 7 provides a general schematic view of the cooktop appliance 100.

As shown in FIG. 6, the griddle plate 310 may be selectively disposed over (e.g., directly above) a corresponding spaced-apart pair of burner assemblies (e.g., a first gas burner assembly 200A and second gas burner assembly 200B). During use, top cooking surface 312 faces away from top panel 102 to receive a cooking item (e.g., food) thereon. By contrast, bottom heating surface 314 may be opposite from top cooking surface 312 and faces top panel 102 during use. Thus, bottom heating surface 314 may face top panel 102 to receive a thermal output (e.g., flame or heated air) from the corresponding burners 240A, 240B of the first gas burner assembly 200A and second gas burner assembly 200B, respectively. As described above, fuel, such as propane or natural gas, may flow through the fuel orifices 124A and 124B of corresponding gas control valves 120A and 120B. As shown, gas control valves 120A and 120B generally provide or are disposed along parallel gas flow paths. From the fuel orifices 124A and 124B, fuel may flow through mixing tubes 126A and 126B and to a corresponding burner 240A, 240B.

Generally, it is understood that the first and second gas burner assemblies 200A, 200B may be identically or uniquely sized. For instance, the burner 240A of the first gas burner assembly 200A may define a first output diameter d1 (e.g., at the radial maximum and/or flame port location of a burner ring 250A) while the burner 240B of the second gas burner assembly 200B defines a second output diameter d2 (e.g., at the radial maximum and/or flame port location of a burner ring 250B). Both output diameters d1, d2 generally correspond to the flame shape and position output by the respective burners 240A, 240B. In some embodiments, the first output diameter d1 may be equal to the second output diameter d2. Thus, the flame output by the first burner 240A may be generally equivalent in size to the flame output by the second burner 240B (e.g., when an equivalent gas flow is provided to each burner 240A, 240B). In alternative embodiments, the first output diameter d1 may be different from (e.g., larger than) the second output diameter d2. Thus, the flame output by the first burner 240A may be larger in size to the flame output by the second burner 240B.

As noted above, controller 130 is operably coupled (e.g., electrically coupled via one or more wires or communication busses) to one or more components corresponding to discrete burner assemblies 200A, 200B. Specifically, controller 130 is operably coupled to a plurality of control valves 120A, 120B, which are each in communication with a flammable gas source 127 (e.g., commercial or residential natural gas supply). As shown, a first control valve 120A is in fluid communication with the first gas burner assembly 200A, while a second control valve 120B is in fluid communication with the second gas burner assembly 200B. In turn, first and second gas control valves 120A, 120B may operate to selectively direct a flow of gas to the first gas burner assembly 200A and the second gas burner assembly 200B, respectively (e.g., as instructed by controller 130).

In some embodiments, the controller 130 includes unique single burner and multi-burner modes. For instance, controller 130 may be configured to alternately operate the first and second gas burner assemblies 200A, 200B in a single burner mode and unique a multi-burner mode. Generally, the single burner mode will provide for operating the first gas burner assembly 200A and the second gas burner assembly 200B independently. In turn, the first gas burner assembly 200A may be active while the second gas burner assembly remains inactive 200B (or otherwise active at a different heat output setting), and vice versa. By contrast the multi-burner mode will provide for operating the first gas burner assembly 200A and the second gas burner assembly 200B together or in concert with each other.

In certain embodiments of the single burner mode, the controller 130 may receive separate independent commands for the first gas burner assembly 200A and the second gas burner assembly 200B. Individual commands may generally direct a desired heat output at only the first burner 240A or the second burner 240B. The actual heat output at each burner 240A and 240B will generally correspond to the amount of gas flowed to that burner 240A or 240B. The control valves 120A, 120B may be positioned (e.g., such that an opening for gas is expanded or contracted) according to the directed heat outputs. In other words, the opening for gas through the first control valve 120A may increase or decrease based on one directed heat output or command, while the opening for gas through the second control valve 120B increases or decreases based on another directed heat output or command. As a result, the first gas burner assembly 200A may be active (e.g., to expel gas for flame production) while the second gas burner assembly 200B is inactive (e.g., such that no gas is expelled therethrough), and vice versa. Moreover, the first gas burner assembly 200A may be active to provide a first level of heat output while the second gas burner assembly 200B is active to provide a second level of heat output (e.g., a greater or lesser heat output than the first heat output).

By contrast to the single burner mode, in certain embodiments of the multi-burner mode, the controller 130 may receive a combined command for the second gas burner assembly 200B and the second gas burner assembly 200B. The combined command may generally direct a desired heat output for both the first burner 240A and the second burner 240B. In response, the first control valve 120A and the second control valve 120B cooperate. In turn, the first control valve 120A and the second control valve 120B are positioned together (e.g., such that an opening for gas through the first control valve 120A is expanded or contracted along with an opening for gas through the second control valve 120B). Specifically, the first and second control valves 120B may be positioned simultaneously according to predetermined relationship. In some such embodiments, the predetermined relationship is a common or equal heat output at the first and second burners 240A, 240B. Thus, the first and second burners 240A, 240B may share a common heat output. In other words, the first and second burners 240A, 240B simultaneously generate the same amount of heat in the multi-burner mode, regardless of the relative heat output level (e.g., high heat, low heat, etc.) in the single-burner mode.

The common heat output of the multi-burner mode may be maintained based on a predetermined chart, formula, or model provided within the controller 130 (e.g., at memory). The predetermined chart, formula, or model may correlate or define the relationship of a desired heat output at the burners 240A, 240B to a flow rate (e.g., the volumetric flow rate in cubic meters per second) of gas to the respective burners 240A and 240B. Additionally or alternatively, the predetermined chart, formula, or model may correlate or define the relationship of heat output at the output to the relative positions of each control valve 120A and 120B (i.e., the degree of rotation corresponding to the relative size of the opening for gas through each control valve 120A and 120B). It is noted that the common heat output may be maintained in embodiments wherein the burner diameters d1, d2 are equal, as well as embodiments wherein the burner diameters d1, d2 are different. Advantageously, an even heat distribution may be provided across the griddle, thereby preventing uneven heat (e.g., across the griddle assembly 300).

Figure 9:
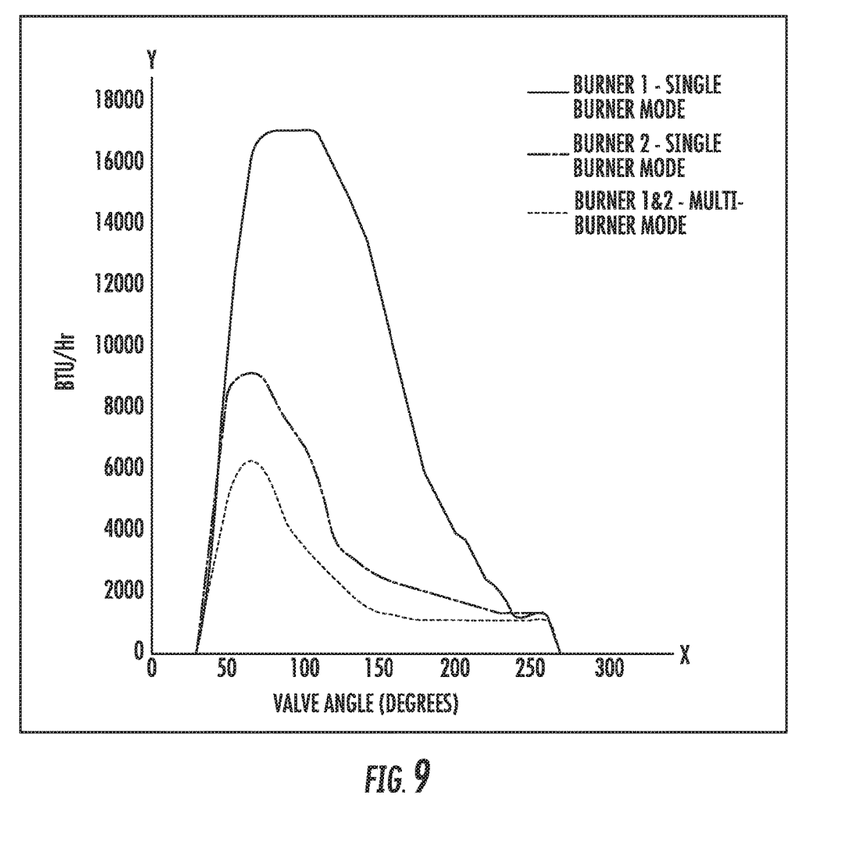
FIG. 9 provides a graphical representation of burner power output to valve positioning for multiple burner assemblies in a single-burner mode and a multi-burner mode.

Turning briefly to FIG. 9, FIG. 9 provides a graph representing heat output of a first gas burner (e.g., first gas burner 240A—FIG. 6) and a second gas burner (e.g., second gas burner 240B—FIG. 6) relative to a position of a corresponding first control valve (e.g., first control valve 200A—FIG. 6) and second control valve (e.g., first control valve 200A—FIG. 6). As illustrated in FIG. 9, both the first burner and the second burner generally provides a range of selectable heat outputs (e.g., in British thermal units per hour—see the Y-axis) that correspond to a position of the first control valve and the second control valve (e.g., a relative rotational position as angle value in degrees—see the X-axis). In the single burner mode, each of the first burner and the second burner has a different range of heat outputs. However, in the multi-burner mode, each of the first burner and the second burner has an equal or identical range of heat outputs relative to a corresponding valve position. Generally, the single burner mode defines a range of selectable heat outputs and singular maximum heat output limits (i.e., maximum BTU/hr value) of the burners. The multi-burner mode defines another range of selectable heat outputs and dual maximum heat output limits (i.e., maximum BTU/hr value) of the burners.

In the illustrated embodiments of FIG. 9, the single burner mode defines a maximum heat output limit of the first burner that is greater than a maximum heat output limit of the second burner. In other words, the singular maximum output limit of the first burner is greater than the singular maximum output limit of the second burner. By contrast, the multi-burner mode defines a dual maximum output limit at each of the first and second burners. The dual maximum output of the first burner is equal to the dual maximum output limit of the second burner. In some such embodiments, the dual maximum output limit(s) is/are lower than the singular maximum output limit of both the first burner and the second burner. In other words, the output level(s) are trimmed for one or more of the corresponding control valves in the multi-burner mode. Thus, the total power output of each burner may be limited in the multi-burner mode. Advantageously, the cooktop appliance 100 will ensure excessive heat is not directed to the griddle assembly 300 (FIG. 6).

Returning to FIGS. 6 and 7, and specifically to FIG. 7, in some embodiments, controller 130 is further operably coupled to a user interface 410 providing one or more inputs for operating the burner assemblies 200A, 200B, 200C, 200D. For instance, user interface 410 may include a touch panel, such as capacitive touch screen, configured to transmit one or more input signals to the controller 130, e.g., based on a directed heat output provided by a user. Additionally or alternatively, user interface 410 may include one or more physical control inputs 412A, 412B, 412C, 412D (e.g., knobs 112 as described above with respect to FIGS. 1 through 5). For instance, a separate control input 412A, 412B, 412C, 412D may be provided for each burner assembly 200A, 200B, 200C, 200D. In the single burner mode, the control inputs 412A, 412B, 412C, 412D may allow the user to activate each burner assembly 200A, 200B, 200C, 200D separately and independently. The control inputs 412A, 412B, 412C, 412D may generally determine a heat output at each corresponding burner assembly 200A, 200B, 200C, 200D. In turn, the first control valve 120A may be independently positioned based on a relative position (e.g., rotated position) of a first control input 412A, and the second control valve 120B may be independently positioned based on a relative position (e.g., rotated position) of a second control input 412B.

In optional embodiments, the multi-burner mode may change the functionality of one or more control input 412A, 412B. For instance, the first control input 412A may be associated with both the first control valve 120A and the second control valve 120B. In turn, both associated valves 120A and 120B may be positioned cooperatively based on the first control input 412A. For instance, cooperatively positioning the first and second control valves 120B may include simultaneously positioning the first control valve 120A and the second control valve 120B according to a relative position (e.g., rotational position) of the first control input 412A. In turn, the relative position of the first control input 412A may simultaneously determine the heat output at both the first burner 240A and the second burner 240B in the multi-burner mode.

Figure 8:
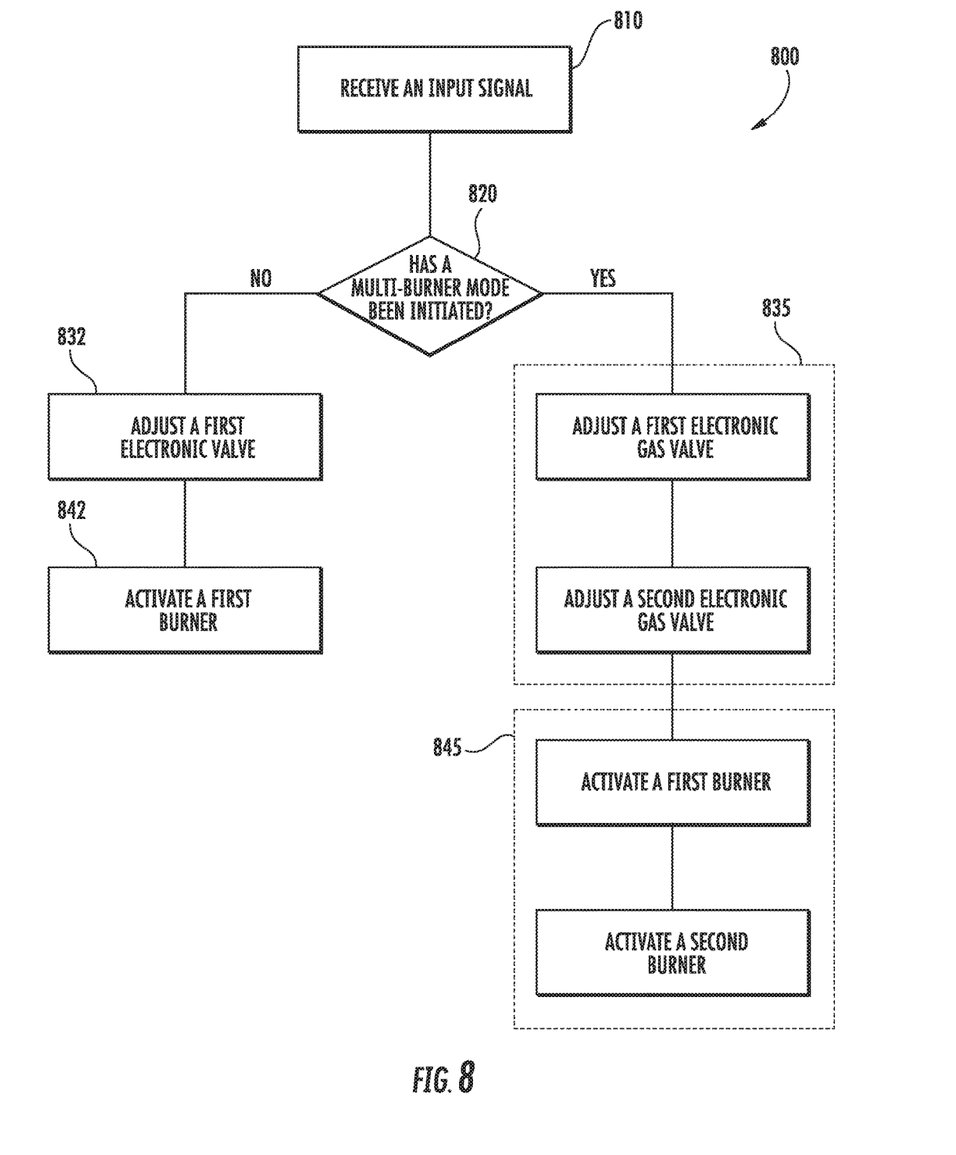
FIG. 8 provides a flow chart illustrating a method of operating a cooktop appliance in accordance with an example embodiment of the present disclosure.

Turning now to FIG. 8, FIG. 8 provides a flow chart of a method 800 according to example embodiments of the present disclosure. Generally, the method 800 provides a method operating a cooktop appliance 100 (e.g., as an operation routine). Specifically, method 800 provides for controlling operation of at least a first gas burner assembly 200A and a second gas burner assembly 200B of a cooktop appliance 100 (e.g., as shown in FIG. 6). As described above, the cooktop appliance 100 may include a panel 102, a first burner 210A in fluid communication with a first control valve 120A, and a second burner 210B in fluid communication with a second control valve 120B. Moreover, the second burner 210B is spaced apart from the first burner 240A. The second control valve 120B is disposed along a parallel flow to the first control valve 120A. The method 800 can be performed, for instance, by the controller 130. For example, as discussed controller 130 may be operably coupled to the first and second burners 240A, 240B, as well as a user interface 410. Controller 130 may further be in communication with other suitable components of the appliance 100 to facilitate operation of the appliance 100, generally. It is understood that FIG. 8 depicts steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure, except as otherwise indicated.

At 810, the method 800 includes receiving an input signal from the user interface. For instance, an input signal may be provided at the user input, such as a knob. The input signal may generally indicate a desired heat output for the first burner or the second burner. Moreover, the input signal may include an operational mode command directing the cooktop appliance to initiate a single burner mode or a multi-burner mode, as described above.

At 820, the method 800 includes determining an operational state of the appliance. Specifically, the controller may determine whether a multi-burner mode has been initiated. For instance, if the input signal of 810 included a multi-burner mode command, the multi-burner mode is determined to be initiated. By contrast, if the input signal of 810 included a single-burner mode command, the multi-burner mode is determined not to be initiated. Additionally or alternatively, an earlier operational command may be received (e.g., independent of the input signal at 810) indicating a single burner mode or a multi-burner mode. The earlier operational command may thus be used to determine the operational state at 820.

If a multi-burner mode has not been initiated, the method 800 may proceed to 832. At 832, the method 800 includes independently positioning one control valve (e.g., the first control valve). The positioning may be based on the received input signal (e.g., single-burner mode command). In some such embodiments, 832 further includes maintaining the first control valve below a singular maximum output limit (i.e., a maximum output limit for the first burner in the single burner mode).

At 842, the method 800 includes independently activating the first burner. For instance, gas directed through the first control valve may be ignited, as described above.

Optionally, the method 800 may include independently include receiving a second single-burner mode command (e.g., at a second control input) in the single burner mode, as described above. In response to the received second single-burner mode command, the method 800 may provide for independently positioning another control valve (e.g., the second control valve) based on the received second single-burner mode command, and independently activating the second burner.

Returning to 820, if a multi-burner mode has been initiated, the method 800 may proceed to 835. At 835, the method 800 includes cooperatively positioning the first control valve and the second control valve based on the received input signal (e.g., multi-burner mode command). For instance, 835 may include positioning the first electronic valve based on a directed heat output at the first burner, and positioning the second electronic valve based on a directed heat output at the second burner. The positioning of both the first electronic valve and the second electronic valve may be based on the same input signal. In some embodiments, the heat output at the second burner is equal to the directed heat output at the first burner, as described above. Moreover, it is noted that the diameter of the first and second burners may be equal or different. Optionally, 835 may include maintaining the first control valve and/or the second control valve below (e.g., limiting the control valve(s) to) a dual maximum output limit that is lower than the singular maximum output limit, as described above.

At 845, the method 800 includes cooperatively activating the first burner and the second burner. For instance, gas directed through the first control valve may be ignited simultaneously with gas directed through the second control valve, as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
   a panel comprising a top surface and a bottom surface;
   a first burner assembly comprising a first burner extending at least partially above the top surface of the panel;
   a second burner assembly spaced apart from the first burner assembly on the panel, the second burner assembly comprising a second burner extending at least partially above the top surface of the panel;
   a first control valve in fluid communication with the first burner assembly to selectively direct a flow of gas thereto;
   a second control valve in fluid communication with the second burner assembly to selectively direct a flow of gas thereto; and
   a controller operably coupled to the first control valve and the second control valve, the controller including a single burner mode and a multi-burner mode, the single burner mode comprising independently positioning the first control valve and the second control valve, the multi-burner mode comprising cooperatively positioning the first control valve and the second control valve,
   wherein cooperatively positioning the first control valve and the second control valve comprises
   positioning the first control valve based on a directed heat output at the first burner, and
   positioning the second control valve based on a directed heat output at the second burner that is equal to the directed heat output at the first burner.

2. The cooktop appliance of claim 1, wherein the first burner defines a first output diameter, and wherein the second burner defines a second output diameter, the first output diameter being larger than the second output diameter.

3. The cooktop appliance of claim 1, wherein the first burner defines a first output diameter, and wherein the second burner defines a second output diameter, the first output diameter being equal to the second output diameter.

4. The cooktop appliance of claim 1, wherein the single burner mode defines a maximum output limit at each of the first and second burners, and wherein the multi-burner mode defines a maximum output limit at each of the first and second burners that is lower than the maximum output limit of at least one of the burners in single burner mode.

5. The cooktop appliance of claim 1, further comprising a griddle plate disposed over the first burner and the second burner, the griddle plate having a bottom surface that faces the top surface of the panel.

6. The cooktop appliance of claim 1, further comprising
   a selectively removable first grate extending at least partially above the first burner in a mounted position; and
   a selectively removable second grate extending at least partially above the second burner in a mounted position.

7. The cooktop appliance of claim 1, wherein the user interface comprises a first control input operably coupled to the controller, and wherein cooperatively positioning the first control valve and the second control valve comprises simultaneously positioning the first control valve and the second control valve according to a relative position of the first control input.

8. The cooktop appliance of claim 7, wherein the user interface further comprises a second control input operably coupled to controller, wherein independently positioning the first control valve and the second control valve comprises positioning the first control valve according to a relative position of the first control input, and positioning the second control valve according to a relative position of the second control input.

9. The cooktop appliance of claim 1, wherein the user interface comprises a touch panel operably coupled to the controller, and wherein cooperatively positioning the first control valve and the second control valve comprises simultaneously positioning the first control valve and the second control valve according to an input signal received from the touch panel.

10. A method of operating a cooktop appliance, the cooktop appliance comprising a first burner in fluid communication with a first control valve and a second burner in fluid communication with a second control valve, the second burner being spaced apart from the first burner and the second control valve being disposed along a parallel flow to the first control valve, the method comprising:
    receiving a single-burner mode command from a user interface;
    independently positioning one of the first control valve and the second control valve based on the received single-burner mode command;
    receiving a multi-burner mode command from the user interface; and cooperatively positioning the first control valve and the second control valve based on the received multi-burner mode command, wherein cooperatively positioning the first control valve and the second control valve comprises positioning the first control valve based on a directed heat output at the first burner, and positioning the second control valve based on a directed heat output at the second burner that is equal to the directed heat output at the first burner.

11. The method of claim 10, wherein the first burner defines a first output diameter, and wherein the second burner defines a second output diameter, the first output diameter being equal to the second output diameter.

12. The method of claim 10, wherein the first burner defines a first output diameter, and wherein the second burner defines a second output diameter, the first output diameter being larger than to the second output diameter.

13. The method of claim 10, wherein independently positioning at least one of the first control valve and the second control valve comprises maintaining the at least one of the first control valve and the second control valve below a singular maximum output limit, and wherein cooperatively positioning the first control valve and the second control valve comprises maintaining each of the first control valve and the second control valve below a dual maximum output limit that is lower than the singular maximum output limit.

14. The method of claim 10, wherein the single-burner mode command is a first single-burner mode command, wherein independently positioning at least one of the first control valve and the second control valve comprises independently positioning the first control valve based on the first single-burner mode command, and wherein the method further comprises receiving a second single-burner mode command; and independently positioning the second control valve based on the received second single-burner mode command.

15. The method of claim 14, wherein the user interface is a first control input, and wherein the second-burner mode command is received at a second control input.

16. A cooktop appliance comprising:

a panel comprising a top surface and a bottom surface;

a first burner assembly comprising a first burner extending at least partially above the top surface of the panel;

a second burner assembly spaced apart from the first burner assembly on the panel, the second burner assembly comprising a second burner extending at least partially above the top surface of the panel;

a first control valve in fluid communication with the first burner assembly to selectively direct a flow of gas thereto;

a second control valve in fluid communication with the second burner assembly to selectively direct a flow of gas thereto; and a controller operably coupled to the first control valve and the second control valve, the controller including a single burner mode and a multi-burner mode, the single burner mode comprising independently positioning the first control valve and the second control valve, the multi-burner mode comprising cooperatively positioning the first control valve and the second control valve, wherein the single burner mode defines a maximum output limit at each of the first and second burners, and wherein the multi-burner mode defines a maximum output limit at each of the first and second burners that is lower than the maximum output limit of at least one of the burners in single burner mode.

17. The cooktop appliance of claim 16, wherein the first burner defines a first output diameter, and wherein the second burner defines a second output diameter, the first output diameter being larger than the second output diameter.

18. The cooktop appliance of claim 16, wherein the first burner defines a first output diameter, and wherein the second burner defines a second output diameter, the first output diameter being equal to the second output diameter.

19. The cooktop appliance of claim 16, further comprising a griddle plate disposed over the first burner and the second burner, the griddle plate having a bottom surface that faces the top surface of the panel.

20. The cooktop appliance of claim 16, wherein the user interface comprises a first control input and a second control input operably coupled to the controller; wherein cooperatively positioning the first control valve and the second control valve comprises simultaneously positioning the first control valve and the second control valve according to a relative position of the first control input; and wherein independently positioning the first control valve and the second control valve comprises positioning the first control valve according to a relative position of the first control input, and positioning the second control valve according to a relative position of the second control input.

* * * * *